March 10, 1931.   H. C. WATSON ET AL   1,795,530
MACHINE FOR THRASHING AND SCUTCHING FLAX
Filed Oct. 24, 1928
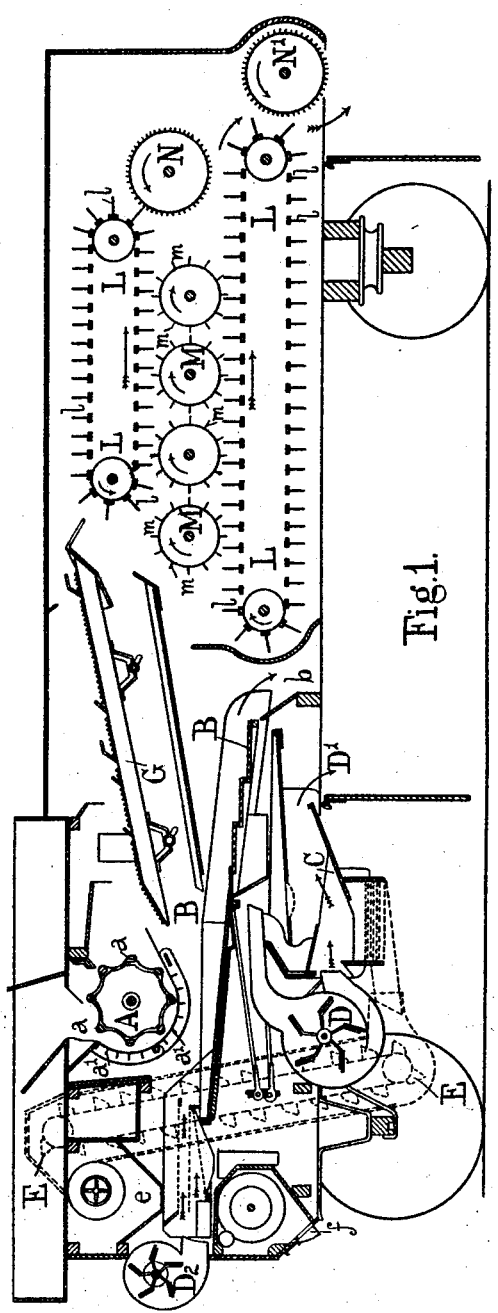
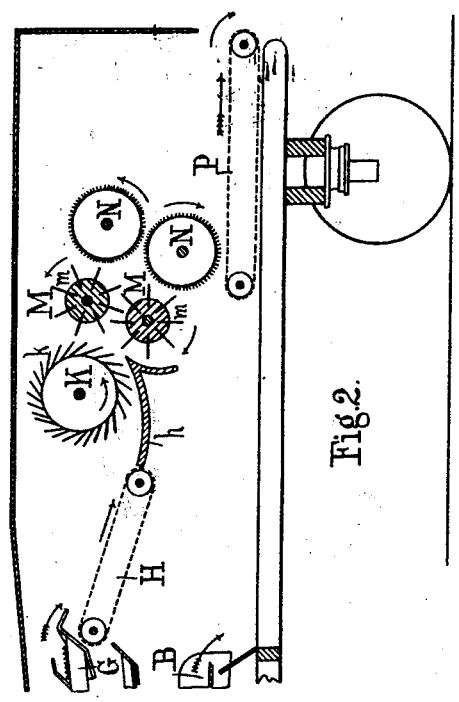
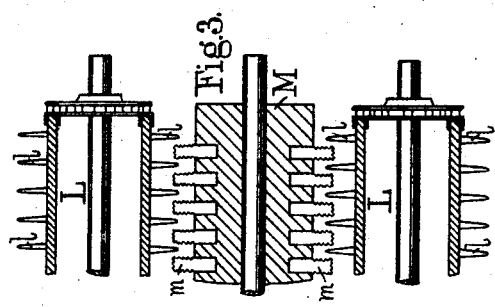
INVENTOR.

Patented Mar. 10, 1931

1,795,530

UNITED STATES PATENT OFFICE

HENRY COWAN WATSON AND MARTIN WADDELL, OF BELFAST, IRELAND, ASSIGNORS TO WATSON-WADDELL LIMITED, OF BELFAST, IRELAND

MACHINE FOR THRASHING AND SCUTCHING FLAX

Application filed October 24, 1928, Serial No. 314,595, and in Great Britain January 6, 1928.

This invention relates to improvements in scutching machines for flax straw.

The invention comprises a plurality of scutching cylinders each constructed with radial serrated blades, spiked lattices travelling above and below the scutching cylinders meshing with the serrated blades of the cylinders to card and remove the woody material from the fibres, and stripping rollers to deliver the treated fibres from the machine.

The invention will be fully described with reference to the accompanying drawings:—

Fig. 1 is a longitudinal section of the improved apparatus showing it in combination with threshing apparatus.

Fig. 2 shows a modified construction of the scutching apparatus.

Fig. 3 is a sectional elevation through the scutching cylinder M and spiked lattices L.

The apparatus to receive the flax straw which may be either cut or pulled is designed to first thrash the straw to remove and preserve the seeds and subsequently to scutch the stalks to break or remove the woody material therefrom. It is constructed with a thrashing cylinder A with blunt or rounded blades $a$ rotating in a thrashing grid $a^1$ through the interstices of which the seeds fall on to an oscillating or jigging sieve B through which the seeds fall and are collected in a receiver or hopper C. The cavings are discharged at $b$ over the end of the jigging sieve B and a fan D blows away the chaff through an aperture at $D^1$ allowing the separated seeds to fall. A fan $D^2$ blows across the seeds as they fall through the grid $a^1$ and assists their movement down the jigging sieve B. The seeds are raised by an elevator E from the hopper C and fall through a chute $e$ and rotary screen F being discharged into receptacles by the spout $f$.

According to the invention the thrashed and de-seeded flax straw after being conveyed from the thrashing cylinder A by an oscillating or jigging conveyor is fed to the scutching cylinders M. A spiked lattice L travels above the scutching cylinders M and a second spiked lattice travels below them. The scutching cylinders are constructed with radial serrated blades $m$ which intersect and inter-mesh together and with the spikes $l$ of the lattices L to scutch and break up the woody constituent of the fibres. The scutching cylinders M and the spiked lattices L are geared together and driven at a surface velocity equal to that of the thrashing cylinder A to take up the straw as fast as it is delivered by the conveyor G from the thrashing cylinder A. The shives drop through the spaces of the bottom lattice. The fibre is gradually conveyed by the two lattices until the top lattice is stripped by the top stripping cylinder N and thrown down on to the bottom lattice, which is stripped by the bottom stripping cylinder $N^1$ and the fibre can be either baled or conveyed to a baling machine.

A series of fluted breaking rollers may be added to the machine either to treat the thrashed and de-seeded straw before it enters the scutching cylinders or after it leaves the scutching cylinders.

In the modification shown in Fig. 2 the thrashed and de-seeded straw is delivered from the oscillating or jigging conveyor G to a lattice feed H by which, a shell feed plate $h$ and feed roller K, it is delivered to a pair of scutching cylinders M.

The lattice feed H is preferably of considerable length so that the straw may be arranged longitudinally thereon. The feed roller K is covered with pins or spikes $k$ hooked or set against the delivery of the straw to grip and hold the straw against the pull of the scutching blades $m$ to enable the blades to give a thorough and effective scutching action upon the straw, the straw being firmly held between the rollers K and the shell feed plate $h$.

The scutching cylinders M are constructed with radial blades $m$ which intersect and are geared together and driven at a surface velocity equal to that of the thrashing cylinder A to take up the straw as fast as delivered from the thrashing cylinder.

A pair of delivery or carding rollers N with straight pins or spikes almost touching the blades $m$ draw the scutched fibres away from the sctuching cylinders M. By reason of the straight radial pins and the velocity of these rollers the fibres are thrown by centrifugal force on to a delivery lattice P placed below and behind the delivery or carding rollers N which carries them away for packing or baling.

Between the feed lattice H and the shell feed plate h a series of fluted breaking rollers may be mounted.

In a modification a feed roller similar to K and the scutching cylinders may be placed adjacent to the thrashing cylinder A to scutch the straw immediately on passing the thrashing cylinders in which case a series of fluted breaking rollers may pass the straw from the thrashing cylinder and the scutching cylinders.

Apparatus for baling the scutched straw may be fitted to the delivery end of the machine.

What we claim as our invention and desire to protect by Letters Patent is:—

1. Apparatus for scutching flax straw comprising a plurality of scutching cylinders each constructed with radial serrated blades, spiked lattices travelling above and below the scutching cylinders meshing with the serrated blades of the cylinders to card and remove the woody material from the fibres, and stripping rollers to deliver the treated fibres from the machine.

2. The combination with a thrashing machine of scutching apparatus comprising a plurality of scutching cylinders each constructed with radial serrated blades, spiked lattices travelling above and below the scutching cylinders meshing with the serrated blades of the cylinders to card and remove the woody material from the fibres and stripping rollers to deliver the treated fibres from the machine.

In testimony whereof we have hereunto set out hands this 29th day of September, 1928.

HENRY COWAN WATSON.
MARTIN WADDELL.